July 1, 1958  R. PERRIER  2,841,455
SHAFT SEAL
Filed Aug. 30, 1957
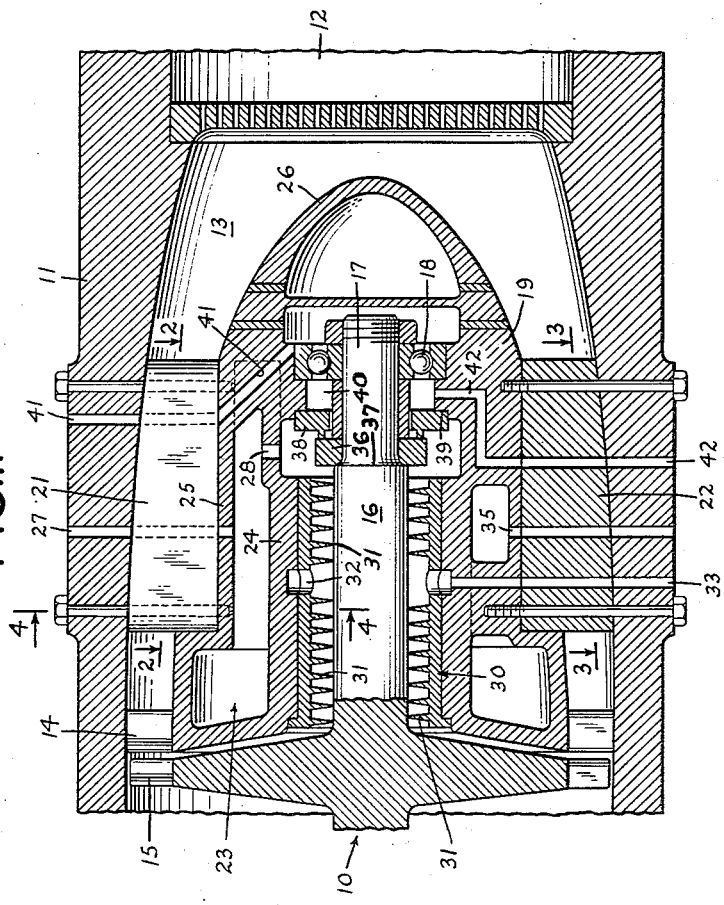
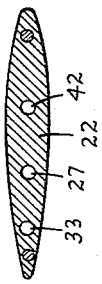
FIG.3.
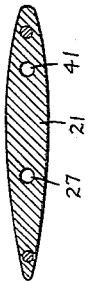
FIG.2.
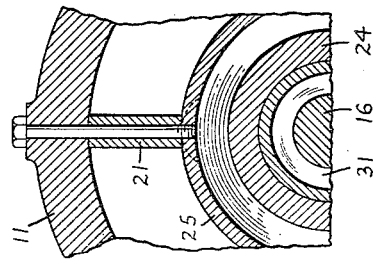
FIG.4.
INVENTOR
ROBERT PERRIER
BY
HIS ATTORNEYS

United States Patent Office 2,841,455
Patented July 1, 1958

2,841,455
SHAFT SEAL

Robert Perrier, Paris, France, assignor to Fairchild Engine and Airplane Corporation, Hagerstown, Md., a corporation of Maryland Application August 30, 1957, Serial No. 681,374

6 Claims. (Cl. 308—77)

This invention relates to rotary engines such as steam and gas turbines and it relates particularly to the seals for the shafts of such engines to protect the bearings for the shaft from high temperature and high pressure gases which are used in the operation of such engines and to prevent leakage around the shafts.

In gas type turbines, highly heated gases are admitted to the turbine casing and directed against the turbine vanes or buckets, thereby spinning the turbine rotor at high speed. Due to the high pressure in the turbine casing, the high temperature and high pressure gases have a tendency to leak out of the casing along the turbine shaft and in so doing, cause power losses and make lubrication of the bearings for the turbine shaft difficult.

In engines which are propelled by gases produced by burning fuel in the presence of the decomposition products of hydrogen peroxide, the loss of gases may be great enough to reduce the efficiency of the engine to a point such that the use of hydrogen peroxide is unfeasible. Moreover, the presence of hydrogen peroxide in the lubricant for the bearings should be avoided, if possible.

In accordance with the present invention, a shaft seal has been provided which includes means for cooling the bearing of the turbine and in which cooling water can be admitted to a hollow jacket and then circulated through a labyrinthian passage around the shaft in such a manner as to oppose the flow of gas along the shaft. Any gases escaping along the shaft towards the water seal will be collected in the water and will be discharged with the water. The water for cooling and sealing the shaft is in itself segregated from a chamber in which the bearing or bearings for the shaft are mounted, and the bearing, therefore, can be supplied with lubricant, such as oil circulated under pressure, to lubricate and cool the bearing. Inasmuch as the cooling water acts as a heat barrier for flow of hot gases along the shaft and also cools the shaft, very little heat is conducted along the shaft to the bearing.

The jacket may be so arranged that gases which might leak into the jacket can be discharged from the jacket through a secondary discharge passage.

The above described structure not only assures diversion of the gases from contact with the bearing but also assures proper cooling of the shaft and maintenance of the bearing and the lubricant therefor at a satisfactory temperature for operation even at high speeds.

For a better understanding of the present invention, reference may be had to the accompanying drawing in which:

Figure 1 is a view in longitudinal section through a turbine casing in which the bearing cooling and lubricating system embodying the present invention is mounted, the turbine wheel also being shown in relation to the casing and the shaft seal and cooling medium;

Figure 2 is a view in cross section taken on line 2—2 of Figure 1;

Figure 3 is a view in cross section taken on line 3—3 of Figure 1, and

Figure 4 is a view in section taken on line 4—4 of Figure 1.

The invention will be described with reference to the use of the shaft seal and bearing for a turbine rotor 10 although it is not limited to this use. The rotor 10 is mounted in a turbine casing 11, which communicates at its right hand end with a combustion chamber 12 or, in the case of hydrogen peroxide, a decomposition chamber in which the fuel is combined with the decomposition products of hydrogen peroxide. The gases flow from the chamber 12 through the passage 13 and the stator vanes 14 therein against the buckets 15 on the turbine wheel, thereby causing the turbine wheel or rotor 10 and its supporting shaft 16 to spin at high speed. A reduced end portion 17 is formed on the shaft and is mounted in an anti-friction bearing 18 of the ball or roller type which is carried in a casing 19 supported by means of a plurality of streamlined struts or spacers 21, 22, etc., as shown in Figures 2, 3 and 4 of the drawings. The casing 19 includes a hollow water jacket portion 23 having spaced apart inner and outer walls 24 and 25. A rounded or pointed heat-shielding extension 26 is attached to the casing 19 and diverts the gases into the passage 13.

Water for cooling the bearing and for sealing the shaft 16 against escape of the gases thereon is admitted to the interior of the jacket 23 by means of an inlet passage 27 which includes aligned openings in the outer casing 11, supporting member 21 and the outer wall 25 of the jacket 23. Cooling water also flows through a passage 28 in the wall 24 into a space between the inner wall 24 of the jacket and the shaft 16. The space is occupied by a member 30 having inwardly extending flanges 31 to provide a labyrinthian flow path between the outside of the shaft 16 and the inner wall 24 of the jacket. The flanges 31 extend down nearly into engagement with the shaft 16 to provide minimum flow area. The water is caused to circulate around the shaft to about the mid-point of the labryrinth where a groove 32 is provided which communicates with a discharge passage 33 through which the cooling water can flow to the exterior of the casing 11. Flanges 31 also extend inwardly from the wall of member 30 nearly into contact with the shaft 16 to reduce the escape of gases from passage 13 or water from passage 28. High pressure gases which flow past the flanges 31 and along the shaft through the labyrinthian member 30 will be discharged through the passage 33 and thus will be effectively blocked from flowing in any substantial quantity to the right-hand end of the member 30. If, however, any of the gases do escape, they will flow backwardly through the passage 28 and will be discharged through a secondary passage 35 which communicates with the interior of the jacket 23. Only minor amounts of the gases can escape in this way, in any event.

In order to prevent leakage of water and the gases into the space where the bearing 18 is located, the shaft 16 may be provided with a metallic ring 36 which bears against a shoulder 37 at the junction of shaft sections 16 and 17. Bearing against and forming a seal with the ring 36 is a carbon ring 38 which is mounted on a shoulder 39 interposed between the labyrinth member 30 and the chamber 40 in which the bearing 18 is mounted.

Lubricating oil is supplied to the bearing 18 and the chamber 40 through a passage 41 which extends through the supporting member 21, the casing 11 and the shell 19 and communicates with the chamber 40. Oil is discharged from the chamber 40 by means of a passage 42 which communicates with the lower portion of the chamber and extends through the casing 19, the spacer and support 22 and the turbine casing 11.

In operation, cooling fluid such as water is introduced under pressure through the inlet passage 27 into the jacket 23 and through the passage 28 into the right hand portion of the labyrinth member 30 in contact with the shaft 16 thereby cooling it. The cooling water is discharged together with any gases escaping along the shaft 16 from the casing 11 through the discharge passage 33. Any gases which may leak into the jacket 23 will be discharged with the water through the discharge passage 35.

Lubricating oil is supplied by a pump or in any other suitable way at about the same pressure as the cooling fluid or water and can be circulated continuously through the bearing in order to lubricate it and keep it at a satisfactorily low operating temperature.

It will be understood that the turbine may be provided with a similar bearing for the other end of the shaft and that similar bearings and shaft seals may be used in other types of machines than in the turbine disclosed herein.

Accordingly, it will be understood that the form of the invention disclosed herein is illustrative and should not be considered as limiting the scope of the following claims.

I claim:

1. In a rotary device receiving heated gases under pressure, the combination of a shaft, a hollow cooling jacket surrounding said shaft in spaced relation thereto, a bearing for said shaft mounted adjacent to one end of said jacket, means mounted between said jacket and said shaft forming a labyrinthian passage therebetween open at its opposite ends, a sealing member interposed between said bearing and said labyrinthian passage for sealing the bearing from said passage, an inlet for supplying cooling fluid into said hollow jacket, means connecting the interior of said jacket to one end of said labyrinthian passage, an outlet for said cooling fluid communicating with about the mid-portion of said labyrinthian passage, and means for circulating oil through said bearing.

2. In a rotary device receiving heated gases under pressure, the combination of a shaft, a hollow cooling jacket surrounding said shaft in spaced relation thereto, a bearing for said shaft mounted in said jacket, means mounted between said jacket and said shaft forming a labyrinthian passage therebetween open at its opposite ends, means enclosing said bearing and including a sealing member interposed between said bearing and said labyrinthian passage and forming a chamber for receiving lubricating oil and for sealing the bearing from said passage, means for circulating lubricant through said chamber, an inlet for supplying cooling fluid into said hollow jacket, means connecting the interior of said jacket to one end of said labyrinthian passage, and an outlet for said cooling fluid communicating with about the mid-portion of said labyrinthian passage.

3. In a rotary device receiving heated gases under pressure, the combination of a shaft, a hollow cooling jacket surrounding said shaft in spaced relation thereto, a bearing for said shaft mounted in said jacket, means mounted between said jacket and said shaft forming a labyrinthian passage therebetween open at its opposite ends, means enclosing said bearing and forming a chamber for receiving lubricating oil and for sealing the bearing from said passage and including a sealing member interposed between said bearing and said labyrinthian passage, means for circulating lubricant through said chamber, an inlet for supplying cooling fluid into said hollow jacket, means connecting the interior of said jacket to one end of said labyrinthian passage, an outlet for said cooling fluid communicating with about the mid-portion of said labyrinthian passage, and another outlet communicating with the hollow jacket at a place remote from said inlet for discharging cooling fluid from said jacket.

4. In a rotary device receiving heated gases under pressure, the combination of a shaft, a hollow cooling jacket surrounding said shaft in spaced relation thereto, a bearing for said shaft mounted adjacent to one end of said jacket, means mounted between said jacket and said shaft forming a labyrinthian passage therebetween open at its opposite ends, a sealing member interposed between said bearing and said labyrinthian passage for sealing the bearing from said passage, an inlet for supplying cooling fluid into said hollow jacket, means connecting the interior of said jacket to one end of said labyrinthian passage adjacent to said sealing member, an outlet for said cooling fluid communicating with about the mid-portion of said labyrinthian passage, and means for circulating oil through said bearing.

5. In a rotary device receiving heated gases under pressure, the combination of a shaft, a cooling jacket having a hollow interior surrounding and in spaced relation to a portion of said shaft, a bearing for said shaft mounted in said jacket, means mounted on said jacket and extending into substantial contact with said shaft forming a labyrinthian passage therebetween having open opposite ends, one of said ends being adjacent to said bearing, means including a sealing member interposed between said one end of said passage and said bearing and forming a chamber enclosing said bearing and isolating it from said passage, means for circulating lubricant through said chamber, an inlet for supplying cooling fluid to the hollow interior of said jacket, a passage connecting the hollow interior of said jacket to said one end of said labyrinthian passage, and an outlet for said cooling fluid communicating with about the mid-portion of said labyrinthian passage.

6. The device set forth in claim 5 comprising a secondary outlet for cooling fluid communicating with the hollow interior of said jacket.

References Cited in the file of this patent
UNITED STATES PATENTS 2,632,395    Jennings et al. _____ Mar. 24, 1953